US007974396B2

(12) United States Patent
McQuilkin et al.

(10) Patent No.: US 7,974,396 B2
(45) Date of Patent: Jul. 5, 2011

(54) SYSTEM AND METHOD FOR MODIFYING PACKAGE SERVICE SUBSCRIPTIONS ONLINE

(75) Inventors: Meredith Lyn McQuilkin, Austin, TX (US); William Gerritt Demzik, Jr., San Antonio, TX (US); Christopher Benjamin Bujanda, McAllen, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 777 days.

(21) Appl. No.: 11/461,168

(22) Filed: Jul. 31, 2006

(65) Prior Publication Data
US 2007/0047713 A1   Mar. 1, 2007

Related U.S. Application Data

(63) Continuation of application No. 10/118,438, filed on Apr. 8, 2002, now Pat. No. 7,099,447.

(51) Int. Cl.
*H04M 3/42* (2006.01)
(52) U.S. Cl. .......... 379/201.01; 379/201.02; 379/201.05
(58) Field of Classification Search ............. 379/201.01, 379/219, 201.02, 201.12, 201.05, 201.03, 379/201.04; 709/225; 705/27
See application file for complete search history.

(56) References Cited

U.S. PATENT DOCUMENTS

| | | | |
|---|---|---|---|
| 4,232,199 A | 11/1980 | Boatwright et al. | |
| 4,782,519 A | 11/1988 | Patel et al. | |
| 5,012,511 A | 4/1991 | Hanle et al. | |
| 5,086,461 A | 2/1992 | Thorn et al. | |
| 5,222,125 A | 6/1993 | Creswell et al. | |
| 5,283,887 A | 2/1994 | Zachery | |
| 5,416,833 A | 5/1995 | Harper et al. | |
| 5,528,677 A | 6/1996 | Butler et al. | |
| 5,557,780 A | 9/1996 | Edwards et al. | |
| 5,644,619 A | 7/1997 | Farris et al. | |
| 5,687,224 A | 11/1997 | Alley, Jr. et al. | |
| 5,696,906 A | 12/1997 | Peters et al. | |
| 5,751,802 A | 5/1998 | Carr et al. | |
| 5,881,131 A | 3/1999 | Farris et al. | |
| 5,883,946 A | 3/1999 | Beck et al. | |
| 5,897,622 A | 4/1999 | Blinn et al. | |

(Continued)

OTHER PUBLICATIONS

Telephone Companies Edging Toward Electronic Commerce, EDI News, p. 1 (start page) (Sep. 4, 1995).

(Continued)

*Primary Examiner* — Thjuan K Addy
(74) *Attorney, Agent, or Firm* — Jackson Walker L.L.P.

(57) ABSTRACT

A disclosed method allows service subscribers to modify service subscriptions online. Operations within the method may include receiving an order for a service package from a subscriber, wherein the service package includes multiple features. In response to the order, the features in the service package may automatically be cross referenced with a list of existing features for the subscriber to detect any overlap between the features in the service package and the existing features. In response to detecting an overlap, a subscription change request may automatically be computed, wherein subscription change request includes only the features in the service package that do not overlap the existing features. The subscription change request may then be submitted for implementation by a service provider, possibly after receiving confirmation of the change request from the subscriber.

19 Claims, 3 Drawing Sheets

U.S. PATENT DOCUMENTS

| | | | |
|---|---|---|---|
| 5,933,489 A * | 8/1999 | Sensabaugh et al. | 379/219 |
| 6,002,758 A | 12/1999 | Ely et al. | |
| 6,055,513 A | 4/2000 | Katz et al. | |
| 6,085,171 A | 7/2000 | Leonard | |
| 6,104,798 A | 8/2000 | Lickiss et al. | |
| 6,115,737 A | 9/2000 | Ely et al. | |
| 6,137,873 A | 10/2000 | Gilles | |
| 6,161,128 A | 12/2000 | Smyk | |
| 6,249,578 B1 | 6/2001 | Gilles et al. | |
| 6,304,647 B1 | 10/2001 | Frost | |
| 6,507,870 B1 * | 1/2003 | Yokell et al. | 709/225 |
| 6,529,596 B1 | 3/2003 | Asprey et al. | |
| 6,532,288 B1 | 3/2003 | Wood et al. | |
| 6,853,715 B2 | 2/2005 | Flanagan | |
| 7,346,562 B2 * | 3/2008 | Inoue et al. | 705/27 |

OTHER PUBLICATIONS

Texas Instruments: Texas Instruments and BellSouth Announce Agreement to Extend EDI Products an dServices to Telecommunications Customers, Business Wire, BW732 (May 24, 1994).

EDI: PAC Bell Tests EDI Transmission of Telephone Bill, Edge p. N/A (May 6, 1991).

Newton, Newton's Telecom Dictionary, 8th Edition, pp. 375 and 1010-1011, Nov. 1994.

Earl Winter and Rob Bright, Escaping the Paper Trap, Wireless Review, vol. 15, No. 9, pp. 28-36 (May 1, 1998).

Venkates Swaminathan and Jason Donahue, Tech 101: Electronic Bonding Gateways, America's Network, p. 20 (Jul. 1, 1997).

Sprint Revolutionizes Business-To-Business commerce with New Internet Application at Super Bowl XXXI, PR Newswire, p. 0115NYW028R (Jan. 15, 1997).

* cited by examiner

SYSTEM AND METHOD FOR MODIFYING PACKAGE SERVICE SUBSCRIPTIONS ONLINE

RELATED APPLICATION

This application is a continuation of and claims priority from U.S. patent application Ser. No. 10/118,438 filed Apr. 8, 2002, the contents of which are hereby incorporated by reference in its entirety.

TECHNICAL FIELD OF THE INVENTION

This invention relates in general to electronic commerce and, more particularly, to a system and a method for modifying service subscriptions online.

BACKGROUND OF THE INVENTION

With the widespread deployment of the Internet and the World Wide Web, the online ordering of products has become commonplace. Consumers frequently find it more convenient to order products such as books from Internet retailers than from traditional, "brick-and-mortar" establishments. For example, the online sales system of a typical Internet retailer allows the customer to shop at any time of the day from the convenience of the customer's home or office. If the customer is simply ordering goods, the online sales system typically need not be very complicated to provide an effective and efficient sales channel. However, not all business transactions are as simple as ordering a book from a vendor. For instance, when services are the subject matter of a transaction, an automated system may not be sophisticated enough to effectively process orders.

What is needed is an online sales system that more fully accommodates the needs of customers and merchants who deal with complicate transactions such as orders for services.

BRIEF DESCRIPTION OF THE DRAWINGS

A more complete understanding of the present invention and advantages thereof may be acquired by referring to the following description, drawings, and claims. In the drawings:

DETAILED DESCRIPTION

Figure 1:
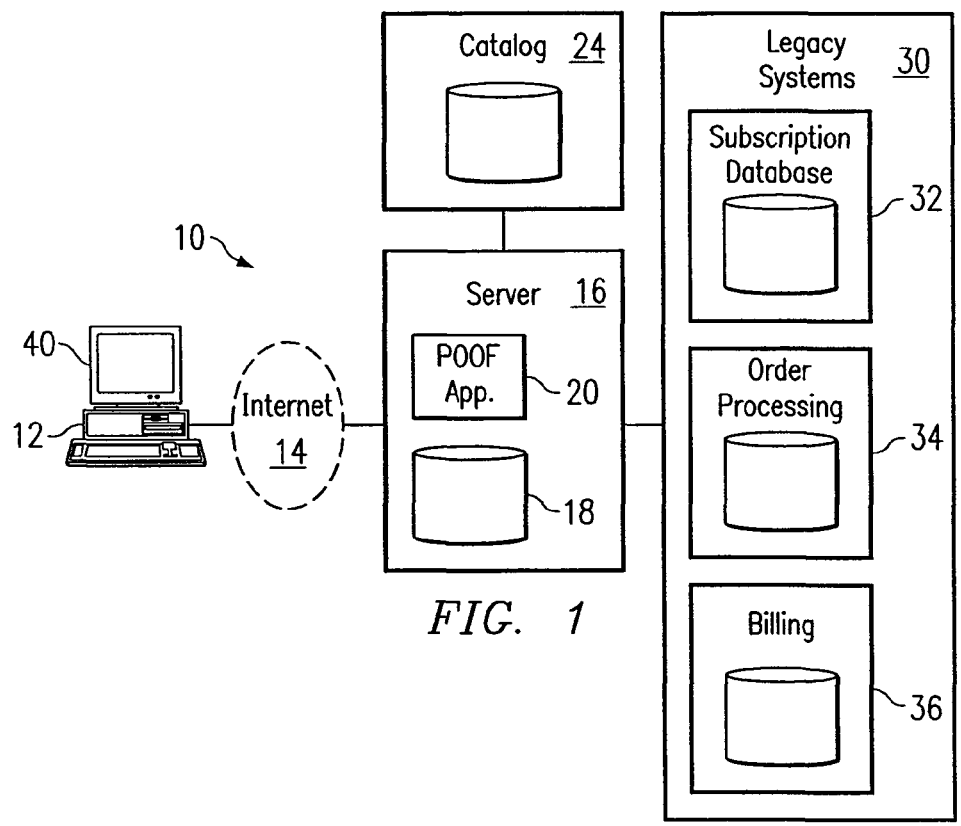
FIG. 1 illustrates a block diagram of an example embodiment of a distributed system with support for online modification of service subscriptions according to the present invention.

When a service subscriber desires to modify his or her service subscription, it may be necessary to consider numerous factors in order to determine whether the desired modification can be implemented. For example, if a telecommunications customer desires to add a feature to an existing telephone service subscription, it may be necessary to determine whether that feature is available in the subscriber's service area, whether the feature is compatible with existing features on the subscription, and whether the subscription already includes the desired feature.

Such determinations may be made by human personnel such as customer service representatives (CSRs). For example, service providers may require subscribers to communicate with a CSR to make any change to a service subscription, and the CSR may make determinations such as those described above by reference to various legacy systems of the service provider. Requiring human intervention to process change requests may adversely affect the customer experience and the efficiency of the sales and delivery processes.

Alternatively, the service provider may allow customers to submit requests online, and staff members may manually review each request to make sure it can be implemented before releasing the request for implementation. For instance, a staff member may access a legacy subscription database to retrieve a list of subscribed features for the customer account, and the staff member may manually cross reference the ordered features with the existing features to validate the order. The staff member may also consider lists of services available in different service areas and lists of incompatible features when validating the order.

A further complication may be encountered when service providers offer feature packages to customers. A feature package typically includes two or more predetermined features. For example, a provider of telecommunications services may offer a package that includes the features of call waiting and caller ID, and the service provider may charge the customer a reduced fee for that package, relative to the total otherwise charged for the individual features. For instance, Southwestern Bell Telephone Company Corporation (Southwestern Bell) offers a package of services under the registered service mark "The BASICS."

Traditionally, change requests involving feature packages have required manual, human validation before submission for implementation by the service provider. For example, after the subscriber submits the order but before the order is released for implementation, personnel may validate whether the package is compatible with existing features and does not include features already being provided to the subscriber. While this approach may increase the convenience for the customer, in that an order may be placed at any time of the day, this approach is still subject to delays and possibilities of error resulting from the need for manual validation of change requests before a request may be submitted for implementation.

By contrast, the example embodiment described herein validates change requests automatically, with no intervening manual validation between the time the customer enters the change request and the time the change request is submitted for implementation. In addition, as described below, if the validation results are negative, the change request may be automatically modified to be valid, and the customer may be notified about those modifications. Furthermore, the example embodiment provides user interface screens that automatically explain the consequences of implementing change requests, with regard to the features to be added and the charges associated with the change requests. Also, the example embodiment gives customers the ability to confirm or cancel change requests, in light of those explanations. Consequently, online orders or requests for modifications of service subscriptions may flow through the process without manual validation. This approach to order processing may therefore also be referred to as flow-through order processing.

FIG. 1 illustrates a block diagram of an example embodiment of a distributed system 10 with support for online modification of service subscriptions according to the present invention. Distributed system 10 includes a workstation 12 connected to a server 16 via the Internet 14. Server 16 includes a package online order flow-through (POOF) application 20, which communicates with customers, such as a subscriber at workstation 12. Server 16 may also communicate with other remote systems, including an auxiliary system 24 and legacy systems 30. Auxiliary system 24 may contain data for a products and services catalog, and legacy systems 30 may be used by the service provider to manage service subscriptions. In the example embodiment, workstation 12, server 16, auxiliary system 24, legacy systems 30, may each include respective software components and hardware components, such as memory, one or more processors, disk drives 18 containing various databases, etc., and those components may work together to provide the desired functionality. The various hardware and software components may also be referred to as processing resources.

In the example embodiment, workstation 12 may be a personal computer with a network interface for communicating over networks such as Internet 14, a display 40 for presenting user interface screens, and input devices such as a mouse and a keyboard. Server 16 may be a single or multi-processor server, a server rack, or some other collection of systems configured to operate cooperatively to provide customers with the ability to modify service subscriptions online.

Legacy systems 30 may be a collection of one or more mainframe computers, minicomputers, microcomputers, or other information handling systems. In the example embodiment, the software applications supported by legacy systems 30 include a subscription database 32 that lists the features currently being provided to each subscriber. The information in subscription database 32 may also be referred to as customer data. The software applications supported by legacy systems 30 may also include a billing application 36 that generates customer bills and an order processing application 34 that accepts and implements change requests.

In the example embodiment, auxiliary system 24 may include hardware similar to workstation 12 or server 16. In alternative embodiments, however, different types of hardware may be used for workstation 12, server 16, auxiliary system 24, and legacy systems 30, depending on the requirements for any particular implementation. In addition, various components may be relocated in alternative embodiments. For example, the catalog of products and services may be stored in server 16 or in legacy systems 30, or other applications may be shifted from legacy system 30 to server 16 or to other systems. Also, legacy systems 30 may be referred to as the back end of the distributed system 10, and server 16 may be referred to as the front end.

In the example embodiment, POOF application 20 may be initially loaded into server 16 from a communications medium such as a network cable, from a removable storage medium such as a CD-ROM or a DVD, or by some other mechanism. POOF application 20 (or portions thereof) may then be loaded into memory and executed by server 16 to provide the functionality described herein.

Figure 2:
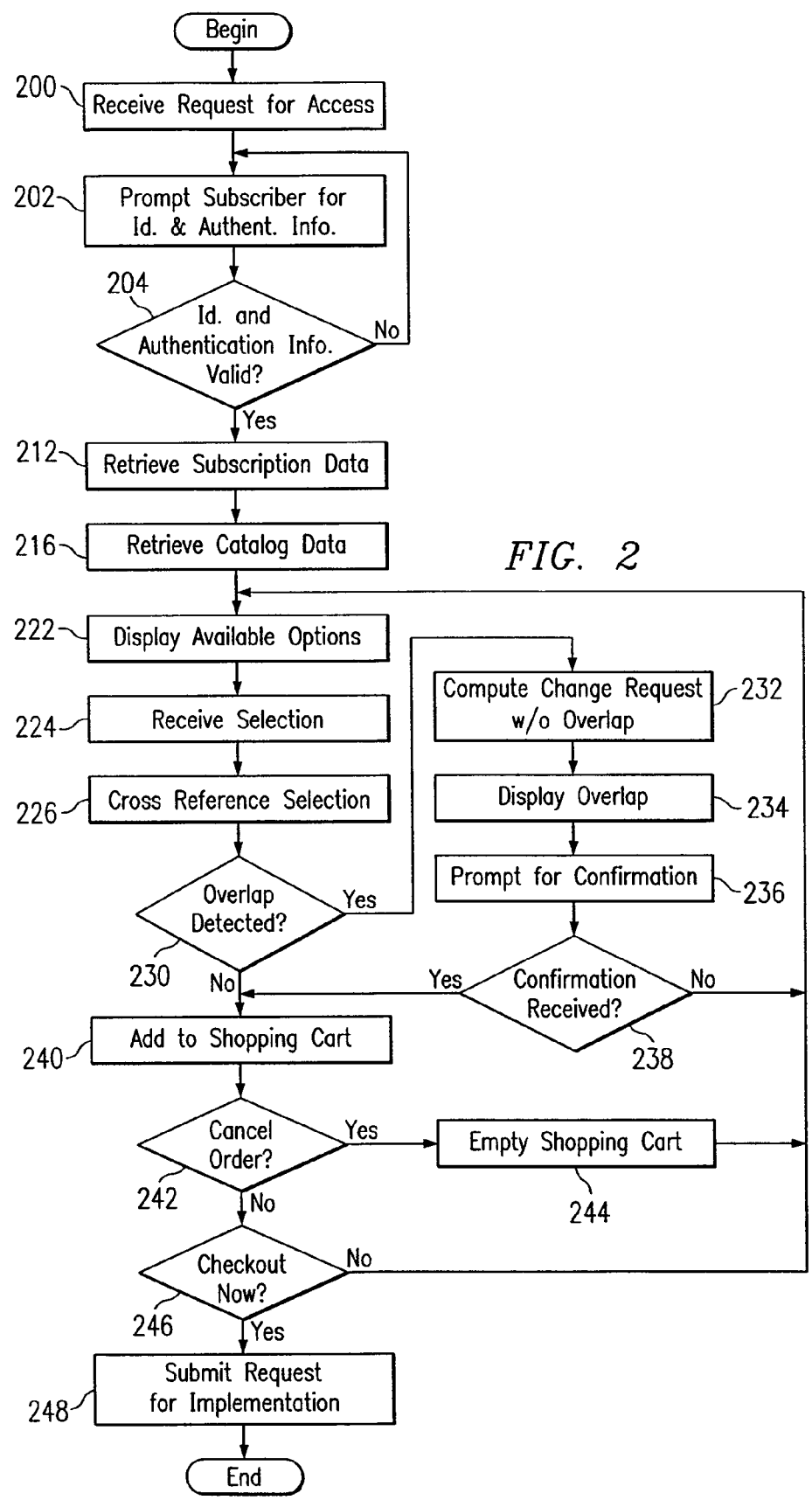
FIG. 2 presents a flowchart of an example embodiment of a process for facilitating online modification of service subscriptions according to the present invention.

FIG. 2 presents a flowchart of an example embodiment of a process for facilitating online modification of service subscriptions according the present invention. The process begins with POOF application 20 executing in server 16. At block 200, POOF application 20 receives a request from a user for online access to view or modify a service subscription. POOF application 20 then prompts the user for identification and authentication information, as depicted at block 202. At block 204, POOF application 20 determines whether the identification and authentication information are valid, and if they are not, the process returns to block 202. However, if the identification and authentication information indicate that the user is a subscriber, POOF application 20 then retrieves subscription data for the subscriber from subscription database 32 and retrieves a list of services from auxiliary system 24, as depicted at blocks 212 and 216. As indicated at block 222, POOF application 20 then sends information to workstation 12 to cause workstation 12 to display a list of service options for the subscriber.

Figure 3:
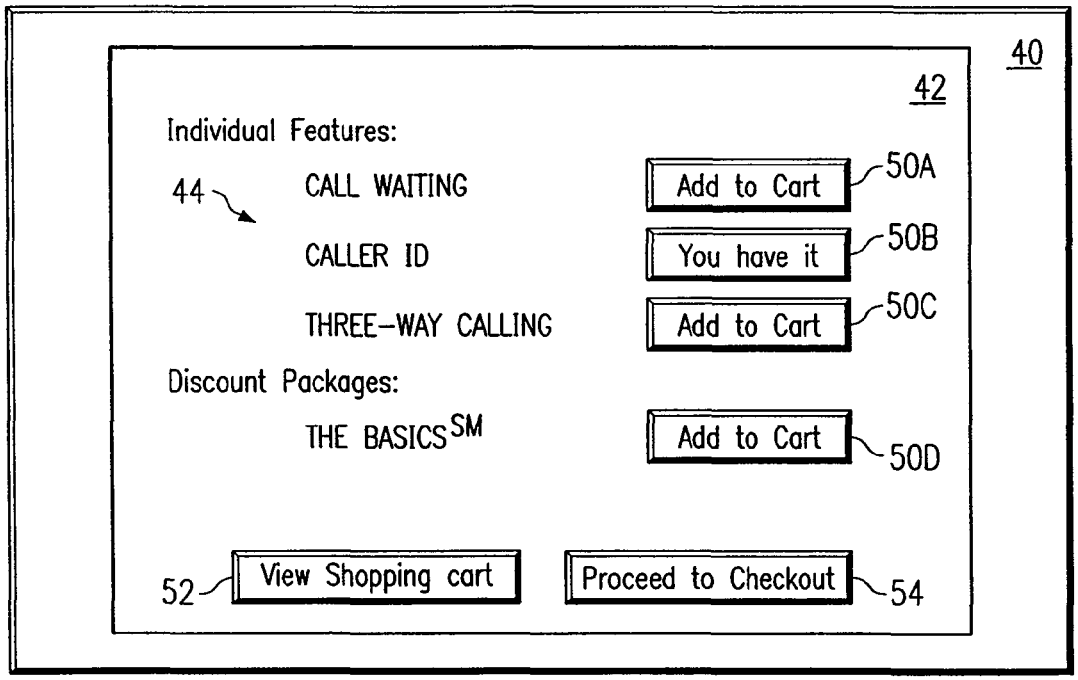
FIGS. 3-5 illustrate example embodiments of user interface screens facilitating online modification of service subscriptions according to the present invention.

For example, with reference to FIG. 3, POOF application 20 may use a markup language such as HTML to encode a web page 42 to be presented in display 40. Web page 42 may include a list of data items 44 corresponding to various features from the catalog of products and services. Data items 44 may include names of features that may be ordered individually, such as call waiting, caller ID, and three-way calling, as well as names of feature packages that provide multiple features, such as The BASICS (SM). For instance, data items 44 may be implemented as hyperlinks, with feature or product names presented as visible text, and with URLs associated with each product name to direct users to pages that contain detailed descriptions of each feature or product. The options displayed in web page 42 thus may include individual features and feature packages. Also, POOF application 20 may provide additional data items 50A-50D in web page 42 to allow the user to order a corresponding feature or feature package. Data items 50A-50D may also be referred to as selection buttons 50A-50D or display items 50A-50D.

Furthermore, POOF application 20 may use the information from subscription database 32 to automatically determine which features are already being provided to the subscriber, and selection buttons 50A-50D may be configured to advise the user which features are already being provided. For instance, button 50B explains to the user that he or she is already subscribed to the caller ID feature. POOF application 20 may also configure buttons 50A-50D to indicate which services have been added to a shopping cart for the user.

Web page 42 may also include additional selectable objects, such as a view shopping cart button 52 and a proceed to checkout button 54. If a user selects view shopping cart button 52, POOF application 20 may transmit a web page to workstation 12 with a list of items ordered during the current session of interaction between the user and POOF application 20. As described below, proceed to checkout button 54 may be used to request a web page summarizing the ordered features for final confirmation.

At block 224 of FIG. 2, after sending web page 42 to workstation 12, POOF application 20 receives a request from workstation 40 to add a feature, for example in response to the user clicking on one of selection buttons 50A-50D. If the user has selected a feature package, POOF application 20 then cross references the features in the selected package with a list of existing features for the subscriber, as depicted at block 226. The existing features may include features that are already being provided to the subscriber, as well as features that the subscriber has already added to his or her shopping cart during the current session of interaction with POOF application 20. For instance, the existing features in the shopping cart may include features that were added to the cart in response to the user selecting a feature package. In the example embodiment, the shopping cart may be stored in server 16.

When a feature package has been selected, POOF application 20 then determines whether any of the existing features overlap with the features in the selected package, as indicated at block 230. If an overlap is detected, POOF application 20 computes a change request that includes the features in the selected package but not the existing features, as shown at block 232. POOF application 20 may thus automatically modify the user's change request to avoid the overlap. At block 234, POOF application 20 sends a new web page to workstation 12 to display for the subscriber information regarding the overlap.

Figure 4:
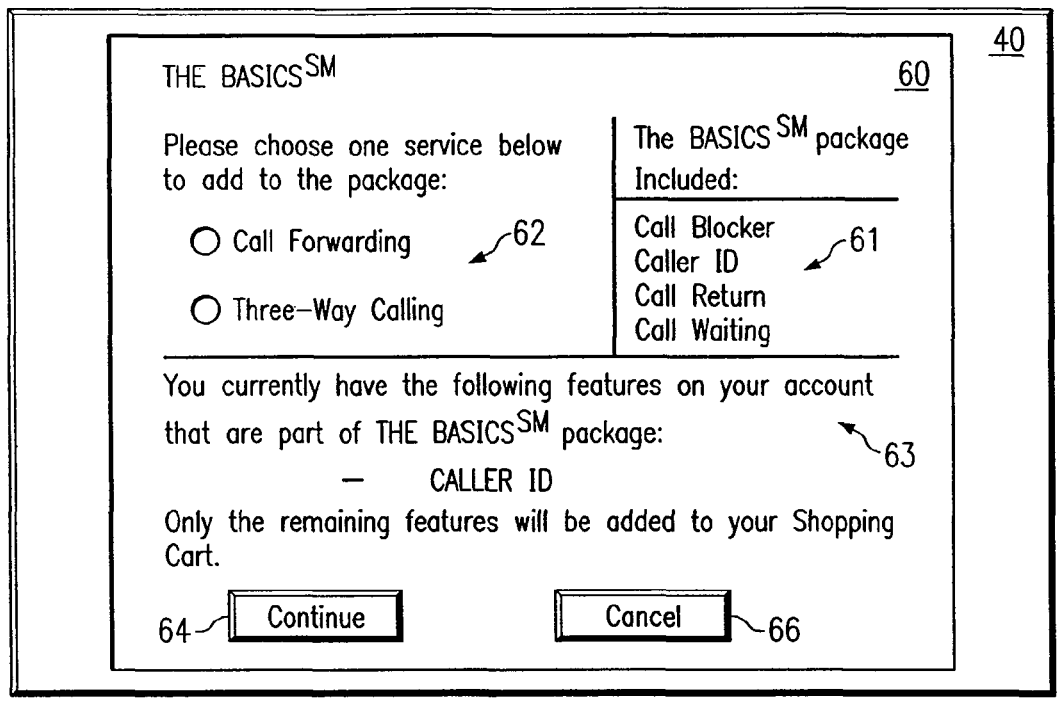

For instance, FIG. 4 depicts an example web page 60 for displaying information regarding overlapping features. In the example embodiment, web page 60 includes a list 61 of the features included in the selected package, as well as overlap explanation 63. As described in greater detail below, overlap explanation 63 may describe which of the features in list 61 are already on the subscriber's account and may explain that only the remaining features will be added to the subscriber's shopping cart. Web page 60 may also include additional objects, such as check boxes 62, to allow the subscriber to customize a feature package, for example by selecting an additional feature to be included in the package. Web page 60 may also include a cancel button 66, which the user may select to abort the operation of adding the selected package and return to the previous web page. Web page 60 may also include a continue button 64, which the user may select to provide preliminary confirmation of the order. Continue button 64 thus serves to prompt the user for confirmation of the modified change request, as depicted at block 236 of FIG. 2.

For example, as illustrated at list 61, web page 40 shows that The BASICS (SM) package includes the features Call Blocker, Caller ID, Call Return, and Call Waiting. Furthermore, overlap explanation 63 advises the subscriber that Caller ID is already on the account, and only the remaining features will be added to the shopping cart. Thus if, the subscriber were to select Call Forwarding as an additional feature and then select Continue button 64, only the following items would be added to the shopping cart: Call Forwarding, Call Blocker, Call Return, and Call Waiting.

At block 238, POOF application 20 then determines whether the user has confirmed acceptance of the modified change request. At block 240, if confirmation was received, POOF application 20 adds the modified change request to the subscriber's shopping cart. However, if the user cancels the order, the process passes from block 238 to block 222, and POOF application 20 re-transmits web page 42, which lists the options available for the subscriber's account.

Figure 5:
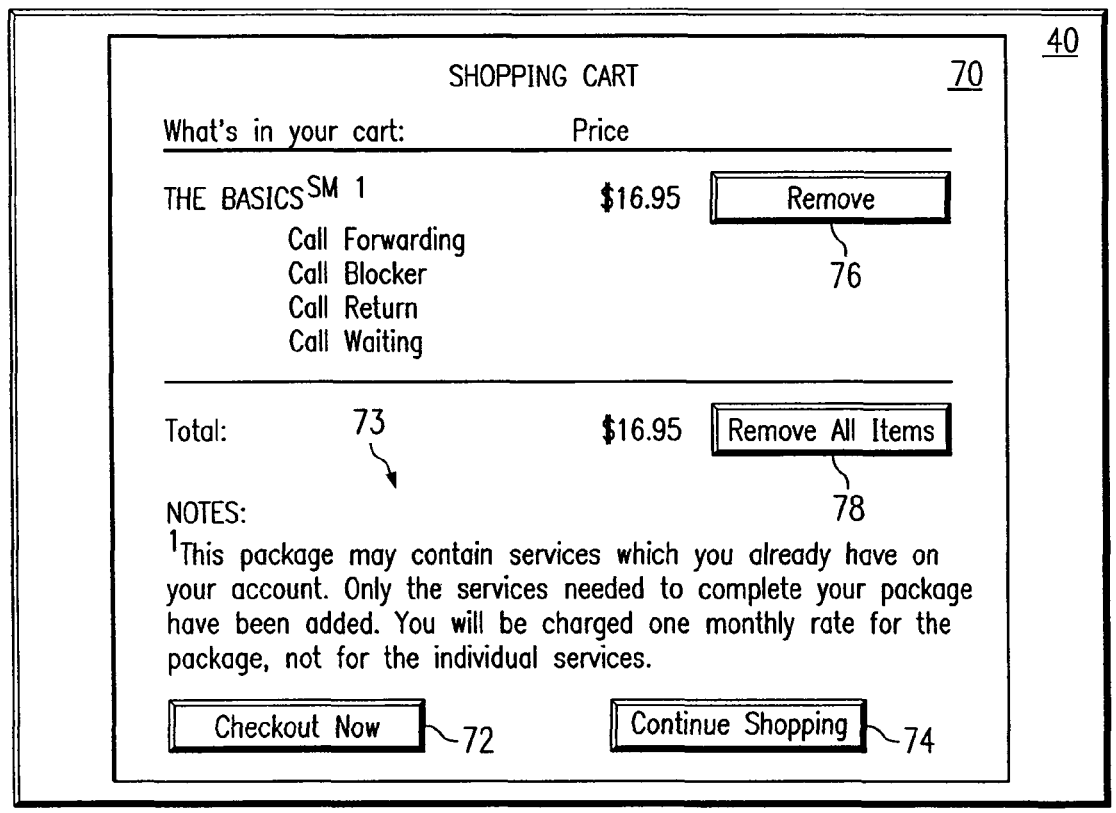

Referring again to block 240 of FIG. 2, and also referring to FIG. 5, when POOF application 20 adds a selected feature or package of features to the shopping cart, POOF application 20 may transmit a web page 70 to workstation 12 for the user, and web page 70 may summarize the features in the shopping cart. If the shopping cart includes a feature package, web page 70 may also include a billing message 73 explaining that the ordered package may contain services which are already on the subscriber's account. As illustrated, billing message 73 may further explain that only the services needed to complete the package will be ordered, and the subscriber will be charged the monthly rate for the package and not for the services that had been provided individually but, according to the order, are now to be provided as part of the package.

Web page 70 may also include a remove button 76 for removing a selected feature or feature package from the shopping cart, a remove all items button 78 for removing all features and feature packages from the shopping cart, and a continue shopping button 74 for returning to the web page which displays the features available to be added to the account. As depicted at block 242 of FIG. 2, if the user cancels the current order (e.g., by selecting remove all items button 78), POOF application 20 removes all features and feature packages from the shopping cart, as depicted at block 244. The process then returns to block 222, and POOF application 20 again transmits web page 42 to workstation 12. If the user does not cancel the order but instead selects check out now button 72, the process passes through blocks 242 and 246 to block 248. POOF application 20 then submits the change request to legacy systems 30 for implementation, as depicted at block 248.

For example, POOF application 20 may transmit the change request to order processing application 34, and in response, order processing application 34 may automatically make the requested features available for the subscriber's account. For instance, in one embodiment, order processing application 34 may include multiple components residing on one or more platforms. Those components may include, for example, (1) a request fulfillment system that serves as middleware to deliver change requests from a Web platform to a legacy platform, (2) a mechanized order generator that translates change requests into a desired format, and (3) a service order retrieval and distribution (SORD) system that distributes formatted change requests to additional components to implement the change requests. For example, the SORD system may cause a network provisioning system in a telephone company central office to modify its software or hardware configuration to add the services to the subscriber's line, and the SORD system may cause a customer record information system to update subscription database 32 to reflect the new services being provided. The SORD system 20 may also update billing application 36 so that future bills will include a charge for the package and not for the individual features that are being subsumed within the package. The process of FIG. 2 may then end.

In addition, POOF application 20 may provide automatic upgrades from individual features to feature packages or from small feature packages to larger feature packages, if appropriate. For example, if a subscriber attempts to add three individual features, and those three features are available at lower cost in a package, POOF application 20 may automatically convert the request from an order for individual features to a package order. The request may then be processed as a request for a feature package, as described above.

In conclusion, as has been described, an order submitted by a subscriber through the online system may flow through server 16 and legacy systems 30 to cause the requested features to be made available for the subscriber's account without any manual intervention. POOF application 20 may nevertheless ensure that change requests submitted to legacy systems 30 are compatible with existing features. POOF application 20 thus ensures accurate, completely electronic delivery of order information from web site shopping carts to order generation and shipping. For instance, when a change request is submitted via POOF application 20, order processing application 34 may also cause a user's guide for the selected features to be shipped to the subscriber as part of the order fulfillment process.

To provide for a comprehensive order processing, POOF application 20 automatically utilizes all relevant information to ensure automatic flow through on the back end for legacy systems. Consequently, POOF application 20 may ensure that a subscriber orders only features that are available in the subscriber's specific calling area, only features that do not create conflicts with other features already on the subscriber's account, and only features that are not already being provided on the subscriber's account. Consequently, POOF application 20 reduces or eliminates the chance that errors may be made during the ordering process. POOF application 20 thus simplifies and enhances the customer experience in attempting to order phone packages online. By contrast, the above complications may cause failures in traditional order change systems, and those failures may lead to non-use of the service offerings, increased help desk calls, reduced customer satisfaction, and in certain cases the loss of a customer.

One of the advantages provided by POOF application 20 is that it provides a unified, uninterrupted interface through which customers can select and order tailored telephone features or feature packages that best satisfy the customers' needs, without the need for customer service intervention. In the example embodiment, the user interface is clear and concise, and it visibly identifies how many features are available for each package. POOF application 20 includes the ability to automatically query the customer account database to ensure incompatible features are not selected. POOF application 20 also includes the ability to identify if selected features are already on the account. And POOF application 20 provides a convenient mechanism for subscribers to upgrade phone packages based on the subscribers' needs and existing services.

Although the present invention has been described with reference to an example embodiment, those with ordinary skill in the art will understand that numerous variations of the example embodiment could be practiced without departing from the scope and spirit of the present invention. For purposes of illustration, an example distributed system has been described. However, one of ordinary skill in the art will appreciate that alternative embodiments could be deployed with many variations in the number and type of components of the network, the network protocols, the network topology, and myriad other details without departing from the present invention.

The example embodiment has also been described with reference to various types of data items, such as hyperlinks, buttons, and check boxes. However, other types of interface objects or data items may be used in alternative embodiments to provide similar functionality. Also, although web pages are used for the user interface screens in the example embodiment, different technologies may be used in alternative embodiments to provide user interfaces in accordance with the present invention.

It should also be noted that the hardware and software components depicted in the example embodiment represent functional elements that are reasonably self-contained so that each can be designed, constructed, or updated substantially independently of the others. In alternative embodiments, however, it should be understood that the components may be implemented as hardware, software, or combinations of hardware and software for providing the functionality described and illustrated herein. In alternative embodiments, information handling systems incorporating the invention may include personal computers, mini computers, mainframe computers, distributed computing systems, and other suitable devices. Additionally, in alternative embodiments, some components of the POOF application could reside on different data processing systems, or all of the components could reside on the same hardware.

Alternative embodiments of the invention also include computer-usable media encoding logic such as computer instructions for performing the operations of the invention. Such computer-usable media may include, without limitation, storage media such as floppy disks, hard disks, CD-ROMs, read-only memory, and random access memory; as well as communications media such wires, optical fibers, microwaves, radio waves, and other electromagnetic or optical carriers. The control logic may also be referred to as a program product.

Many other aspects of the example embodiment may also be changed in alternative embodiments without departing from the scope and spirit of the invention. The scope of the invention is therefore not limited to the particulars of the illustrated embodiments or implementations but is defined by the appended claims.

What is claimed is:

1. A data processing system that automatically validates a request from a user to add a package of features to an existing set of features, the data processing system comprising:
   processing resources which, when executed, perform operations comprising:
   causing a data item representing a service package to be displayed in a workstation;
   receiving identification information for the subscriber from the workstation;
   using the identification information to retrieve the existing set of features;
   receiving input from the workstation indicating that the subscriber has selected the service package;
   in response to the input from the workstation, automatically cross referencing the features in the selected service package with the existing set of features to detect any overlap between the features in the selected service package and the existing set of features; and
   in response to detecting an overlap, automatically performing further operations including:
   computing a subscription change request that includes only the features in the selected service package that do not overlap the existing set of features;
   causing the workstation to list the existing set of features that also appear in the selected service package;
   causing the workstation to signal that the subscriber will not be billed separately for the existing features that also appear in the selected service package;
   causing the workstation to prompt the subscriber for confirmation of the subscription change request; and
   submitting the subscription change request to a legacy order processing system for implementation only if the subscriber confirms the subscription change request.

2. A method for processing an order, the method comprising:
   in response to receiving an order from a buyer indicating a set of requested components, comparing the requested set of components to a set of existing components associated with the buyer to detect any overlap between the set of requested components and the set of existing components;
   in response to detecting an overlap between the set of requested components and the set of existing components, listing the overlapping items and modifying the order wherein the modified order includes only components that do not overlap the existing components; and
   submitting the modified order for fulfillment by a provider.

3. The method of claim 2, further comprising:
   prior to said comparing, causing a data item representing at least one of the components of the order to be displayed in a workstation for the buyer; and
   prior to said causing, receiving input from a workstation indicating that the buyer has selected the order.

4. The method of claim 2, further comprising:
   receiving identification information for the buyer; and
   using the identification information to retrieve a list of existing components for the buyer from a legacy system.

5. The method of claim 2, further comprising:
   causing a workstation to prompt the buyer for confirmation of the modified order; and
   submitting the modified order only if the buyer confirms the modified order.

6. The method of claim 2, wherein:

submitting the modified order comprises causing a legacy order processing system to be updated; and the method further comprises updating a legacy billing system to bill for the components of the modified order.

7. The method of claim 2, further comprising, in response to detecting an overlap, causing a workstation to display information about the detected overlap for the buyer.

8. The method of claim 2, further comprising:

when the existing components include a separately billed component and the ordered components also include the separately billed component, computing a price based on a price for the ordered components and not the separately billed component;

and causing a workstation to display the computed price for the buyer, with an explanation that the separately billed component will not be billed separately.

9. The method of claim 2, wherein the existing components comprise features already being provided to the buyer.

10. The method of claim 2, wherein the existing components comprise features listed in a shopping cart for the buyer.

11. A computer program product comprising instructions, stored on a non-transitory computer readable medium, for processing an order from a buyer, said instructions including:

instructions to detect an overlap between items associated with an original order and items already associated with the buyer;

instructions to display information about a detected overlap to the buyer including instructions to list the overlapping items;

instructions to modify the original order to eliminate the overlap; and instructions to submit the modified order for processing.

12. The computer program product of claim 11, further comprising instructions to display a data item representing at least one of the items associated with the modified order.

13. The computer program product of claim 11, further comprising instructions to retrieve a list of items associated with the buyer responsive to receiving identification information indicative of an identity of the buyer.

14. The computer program product of claim 11, further comprising instructions to prompt the buyer to confirm the modified order.

15. The computer program product of claim 11, further comprising instructions to update a legacy billing system to bill only for the items in the modified order.

16. The computer program product of claim 11, wherein the displayed information identifies differences between the original order and the modified order.

17. The computer program product of claim 11, wherein the displayed information informs the buyer that the buyer will not be billed for any items not present in the modified order.

18. The computer program product of claim 11, wherein the items associated with the original order include a package of items and wherein the items already associated with the buyer include at least one of the items in the package of items.

19. The computer program product of claim 18, further comprising instructions to provide a display indicating the individual items in the package of items already associated with the buyer.

* * * * *